July 6, 1965     J. D. LUCEY ETAL     3,192,899
DEVICE FOR THE STORAGE OF SHELLFISH
Filed May 29, 1962                    8 Sheets-Sheet 1

INVENTORS:
JOHN D. LUCEY
HENRY N. JOHNSON
BY
ATTORNEYS

INVENTORS:
JOHN D. LUCEY
HENRY N. JOHNSON
BY

ATTORNEYS

July 6, 1965   J. D. LUCEY ETAL   3,192,899
DEVICE FOR THE STORAGE OF SHELLFISH
Filed May 29, 1962   8 Sheets-Sheet 4

INVENTORS:
JOHN D. LUCEY
HENRY N. JOHNSON
BY
ATTORNEYS

July 6, 1965 J. D. LUCEY ETAL 3,192,899
DEVICE FOR THE STORAGE OF SHELLFISH
Filed May 29, 1962 8 Sheets-Sheet 5

INVENTORS:
JOHN D. LUCEY
HENRY N. JOHNSON
BY
ATTORNEYS

July 6, 1965 J. D. LUCEY ETAL 3,192,899
DEVICE FOR THE STORAGE OF SHELLFISH
Filed May 29, 1962 8 Sheets-Sheet 6

— FIG. 9. —

INVENTORS:
JOHN D. LUCEY
HENRY N. JOHNSON
BY
ATTORNEYS

July 6, 1965   J. D. LUCEY ETAL   3,192,899
DEVICE FOR THE STORAGE OF SHELLFISH
Filed May 29, 1962   8 Sheets-Sheet 7

INVENTORS:
JOHN D. LUCEY
HENRY N. JOHNSON
BY
ATTORNEYS

July 6, 1965  J. D. LUCEY ETAL  3,192,899
DEVICE FOR THE STORAGE OF SHELLFISH
Filed May 29, 1962  8 Sheets-Sheet 8

INVENTORS
John D. Lucey
Henry N. Johnson
BY
Browne, Schuyler & Beveridge
ATTORNEYS

3,192,899
DEVICE FOR THE STORAGE OF SHELLFISH
John Desmond Lucey and Henry Neil Johnson, Bridlington, England, assignors to Lobstor (Bridlington) Limited, Bridlington, England, a British company
Filed May 29, 1962, Ser. No. 198,589
Claims priority, application Great Britain, May 30, 1961, 19,395/61
7 Claims. (Cl. 119—4)

This invention relates to a unit in which may be stored live shellfish, for example, crawfish, escallope such as mussels, winkles and particularly lobsters. Live shellfish include both molluscs and crustacea.

It is known that shellfish require certain living conditions if they are to survive storage and remain in an edible state. Lobsters, especially, require controlled levels of temperature, salinity and oxygen if they are to remain active and healthy in storage.

It is well known to keep shellfish, particularly lobsters, in floating boxes in the sea or in rock pools naturally or artificially constructed and to transport the fish from the fishing areas in welled boats. All these methods are applicable only in coastal areas where sea-water is readily available and the natural living conditions are present. It is also known to pack shellfish, either individually or in batches, with moisture containing materials such as seaweed, parsley, etc., and to surround the package with ice to maintain a suitable temperature, but this method is useful for short term storage only.

It is an object of the invention to provide a means of storage of live shellfish over long periods if so required, by the use of a self-contained unit occupying a relatively small space, operating at small cost and requiring only a small amount of sea water per lobster and only a small power consumption.

A further object of the invention is to provide a storage means whereby the shellfish, in particular lobsters, may if desired be stored in a state of partial immersion.

According to the present invention, a unit for the storage of live shellfish, particularly crawfish and lobsters, comprises a plurality of trays vertically disposed one upon another, each tray having at least one perforation therein, the uppermost tray being provided with a sea-water feeding device. The topmost tray may be provided with a cover through which projects a water spraying device.

The present invention also provides a method of storing shellfish which comprises disposing said shellfish in a plurality of trays disposed one above the other each tray having at least one perforation therein and continuously feeding sea-water to the upper most tray.

The unit may be provided with a conventional water pump whereby to circulate the water from below the lowermost tray to above the topmost tray, a refrigerating system whereby to cool either the sea-water directly or the air directly, a thermostatic control system for the temperatures of the sea-water or the air, a time clock device to enable working of the unit at regular intervals of time to facilitate aeration of the sea-water therein and an immersion heater whereby to warm the water should such heating become necessary.

When the cooling coils are situated internally, i.e. inside the reservoir, care must be taken to avoid the use of toxic metals in their construction.

The trays may be contained within a framework or may be stacked directly one upon another, vertical alignment of the trays being preferable.

The framework may take the form of a cabinet in which the walls are fitted with projecting ledges or recesses with which the trays co-operate, so as to be in substantially vertical alignment. The projections may be spaced that there may be inserted between two adjacent trays, a further shallow tray for the purpose of catching the circulating sea-water as it flows through a tray which is partially extracted for the purpose of insertion or removal of shellfish.

When it is required to operate the unit, sea-water of the correct composition for the shellfish to be stored is cooled to the appropriate temperature by air or water refrigeration and pumped to flow into the uppermost tray. The water may be retained on each tray to a predetermined depth, determination of depth being carried out by the selection of the height and diameter of the overflow perforations, the diameter and number of the base perforations, if used, and by the quantity of sea-water in use. The shellfish are placed on each tray and may be stored for long periods. The sea-water is circulated downwards through the trays into the reservoir section from which it may be recycled through the pump, etc. The sea-water line from the pump to the top tray is preferably flexible and may be ¾" polythene tubing. The sea-water may be purified by filtration in any known manner, for example by insertion of a filter beneath the bottom trays, comprising cheesecloth, foam rubber or similar non-toxic material. Where the storage period is not lengthy, filtration may not be necessary. When the condition of the water deteriorates below the quality required for effective storage of the shellfish, it may be removed and replaced by fresh sea-water conforming to the appropriate standards for the shellfish in storage. If sea-water should be required and natural sea-water is not readily available, an artificial sea-water may be made in accordance with the following formula:

|  | Lbs. | Oz. |  |
| --- | --- | --- | --- |
| NaCl | 14 | 2 | To make 50 Imperial gallons with tap water. |
| MgSO$_4$.7H$_2$O | 3 | 7½ | |
| MgCl$_2$.6H$_2$O | 2 | 12 | |
| CaCl$_2$.2H$_2$O |  | 11½ | |
| KCl |  | 5½ | |

Since chlorine is toxic to some shellfish including lobsters, it is desirable when making up an artificial sea-water to avoid a heavily chlorinated tap water and to use distilled water. Lobsters are known additionally to be sensitive to certain metals, for example copper, zinc, lead and monel. When lobsters are to be stored, the preferred temperature is 50° F., although they may be stored at 35–60° F. Ample oxygen is desirable, the minimum requirement being 4.3 p.p.m.

The oxygen content of the water may be maintained by aeration introduced by intentional supply of additional air or it may be achieved by the simple method described as follows. If the pump is cut out for a short time, the water will drain from each of the trays in turn, thus effecting say, a 25% air change (in the case where 1" of water is used in a 4" tray). Simultaneously air will be displaced from the reservoir and will be unable to move upwards whilst the water is draining. When the pump restarts, the air will be displaced downwards towards the reservoir. Air changes will also occur by reason of the overflow perforations since passages therethrough by the circulating water could be expected to cause a vortex syphon type of action and thus transfer air from one tray to the next lower one. Considerations of the basic metabolic rate of the lobster have shown this simple method to be suitable for effective storage.

When it is desired to introduce air in amount greater than that achieved by the above method, as for example, when a unit is loaded to capacity and the oxygen concentration of the sea-water has fallen to below the desirable minimum, a pump may be employed to provide additional air to the sea-water.

A suitable pump may comprise a rigid casing within which an impeller consisting of a number of flexible vanes rotates the vanes impinging upon a knuckle on the casing interior surface during each revovlution. The bending of the vanes against the knuckle leads to expression of the water on the one side and suction thereof on the other. A controlled air entry at the suction side of the pump permits the suction thereinto of a controlled amount of air which is thoroughly mixed with the water. The expressed water is therefor supersaturated with air. The preferred pump is fabricated from synthetic resinous material and includes an impeller which rotates at 1300 revolutions per minute. It is also operable above water level.

Changing of the water may be effected simply by disconnecting the pump and allowing the water to drain away. Fresh water may be inserted either through the trays or directly into the reservoir.

To afford more economic operation of the unit it may be insulated, especially against heat gain, from the surroundings. Any of the well known insulating materials, e.g. cork, expanded polystyrene, may be used.

When shellfish having claws are to be stored in this unit it is advisable to ascertain the method which may have been adopted to immobilize their claws. Whilst the usual method utilises cord binding or cuts the main extensor tendon, brass or copper wire may sometimes be used. In view of the toxity of these metals, it is not advisable to store shellfish whose claws are so bound.

Whilst it is not usual to feed the stored shellfish, they may be fed if desired, and in this case the water should be changed more frequently and the filter cleaned as necessary.

Whereas the existing well known methods require large amounts of water, the unit of the invention uses relatively little. For example, 30 lbs. lobster may be stored in only 900 cubic inches of water, in comparison with known literature values of 1 lb. shellfish per 277 cubic inches or 184 cubic inches.

Where a display section is desired, it may be mounted some distancce from the storage unit but may be connected to it by to and fro twin bore polythene tubing, preferably insulated.

A suitable display section comprises a chamber having a window therein for viewing the contents of the chamber, an inlet for sea-water from the reservoir of the storage unit and an outlet for sea-water to the reservoir of the storage unit.

The present invention will be further illustrated by way of the accompanying drawings in which.

With reference to FIGS. 1 to 4 the unit comprises a plurality of trays 1 which have rebates 13 (FIG. 3), the recesses 13 in each tray 1 accommodating the adjacent upper tray 1. The base 7 of each tray 1 has corrugations 8 therein for strength and perforations 9 of diameter suitable to the flow of sea-water desired. A further perforation 10 is provided as an overflow and desirably projects 1″ above the tray base 7 and is suitably ¾″ in diameter.

The perforations 10 are not vertically aligned in adjacent trays 1.

The lowermost tray 1 is supported on a container 2 which acts as a reservoir for the sea-water 3 and holds sufficient sea-water 3 to provide a depth of 1″ in each of the trays 1 when the unit is in operation in addition to a reserve quantity. Container 2 also contains a filter 4 situated beneath the lowermost tray 1 and above the level of the water 3 in the container 2 when the unit is in operation.

Figure 4:
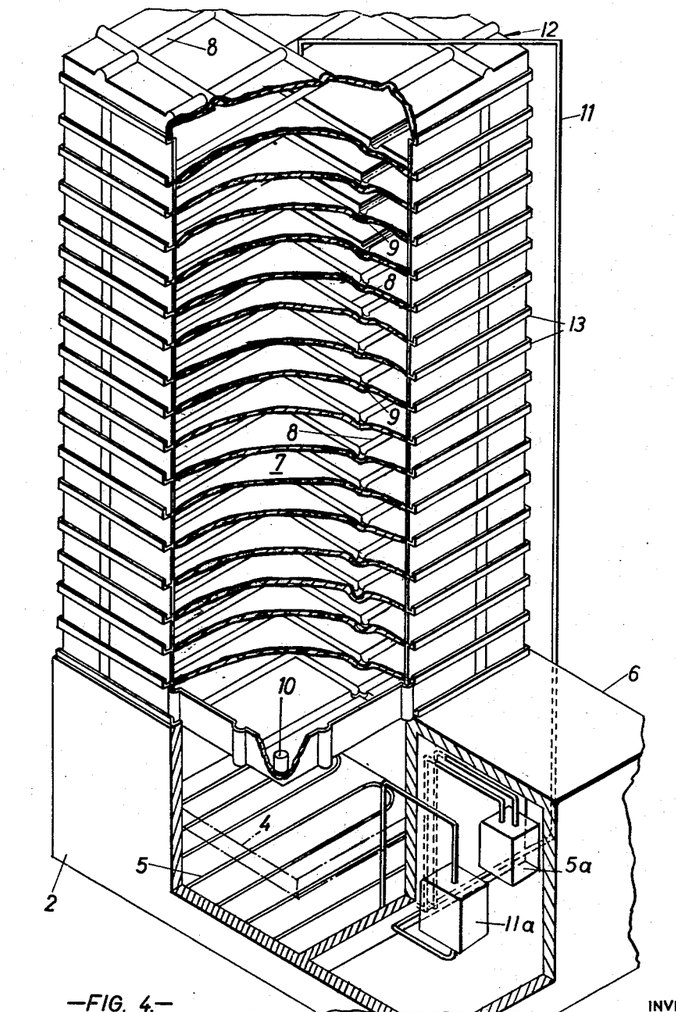
FIG. 4 is a perspective view of a slightly modified unit of FIG. 1.

Disposed adjacent the container 2 is a housing 6 which contains a refrigeration system 5a having cooling coils 5 situated in the container 2 near the bottom thereof so as to always be immersed in the water 3 therein. These coils 5 may be helical (FIG. 1) or more preferably flat (FIG. 4).

Figures 1, 2:
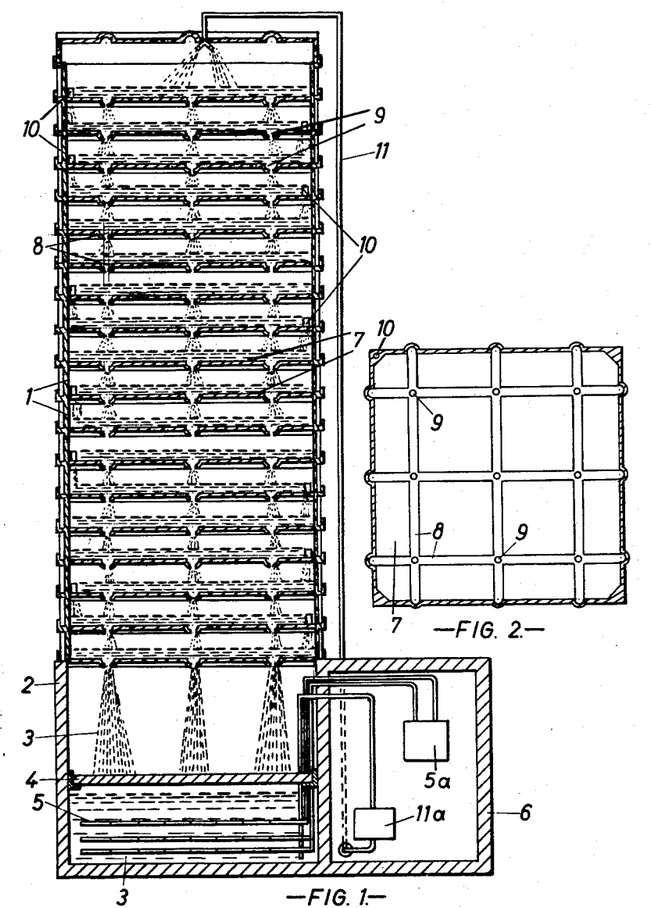
FIG. 1 is a side elevation of a vertical section of a unit according to a preferred embodiment of the present invention.
FIG. 2 is a plan view of the base of the trays of FIG. 1.
Figure 3:
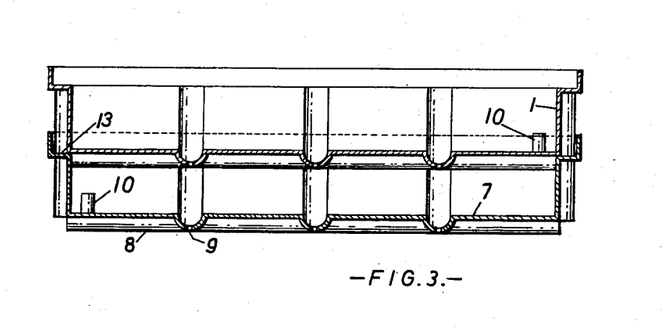
FIG. 3 is an enlarged detail of the arrangement of the trays of FIG. 1.

Also disposed in the housing 6 is a water pump 11a by means of which sea-water 3 in container 2 is pumped through a flexible pipe 11 projecting through a cover 12 into the uppermost tray 1 through which it passes by way of perforations 9 and 10 into the lower trays 1 and eventually back to the container 2. The trays 1, reservoir container 2 and housing 6 may be constructed of reinforced fibre glass plastic. The pump 11a may be controlled by a time-clock (not shown) which periodically stops the pump 11a for a short period of time to aerate the sea water in the container 2.

Figure 11:
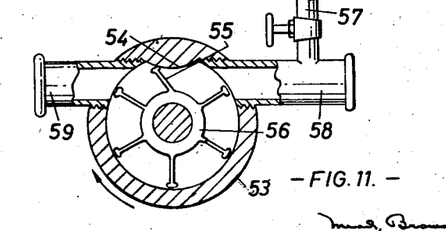
FIG. 11 is a diagrammatic representation of a pump suitable for the provision of aerated water and FIG. 12 is a diagrammatic representation showing the combination of the unit of FIGS. 1 to 4 and the display section of FIGS. 5 and 6.

With reference to FIG. 11 the pump 5a which is preferably employed is one which facilitates a high degree of aeration to the sea water 3 than would be obtainable by transfer from one tray (1) to the adjacent tray (1). This pump 5a comprises a rigid casing 53 on the internal surface of which is a knuckle 54 against which vanes 55 of the impeller 56 impinge on rotating in the direction shown by the arrow. A controlled air supply enters through inlet 57 whilst the water 3 enters through inlet 58 both entries being on the suction side of the pump 5a. The water 3 saturated with air is expelled through outlet 59.

It will be seen that by using the aforesaid apparatus of FIGS. 1 to 4 the shell fish are partially immersed in the sea-water which facilitates the oxygenation of the shell fish by virtue of the shellfish taking in a water-air mixture through the gills which is especially valuable in respect of the resuscitation and maintenance of life in the shellfish especially lobsters, crawfish and crabs.

Further the water distribution through a plurality of perforations in the trays prevents stagnation of water and excessive accumulation of toxic waste and ensures an adequate circulation through all portions of the trays. The use of the small perforations in the trays further assists in the oxygenation of the water as it passes from tray to tray. This oxygenation of the water is further enhanced by means of the pump (FIG. 1).

Again in the event of electric power failure or mechanical failure of the sea-water circulation system all the shellfish storing compartments are automatically emptied of sea-water which enables the shellfish to survive for a much larger period than if totally immersed with the aeration refrigeration systems out of order.

Figures 5, 8:
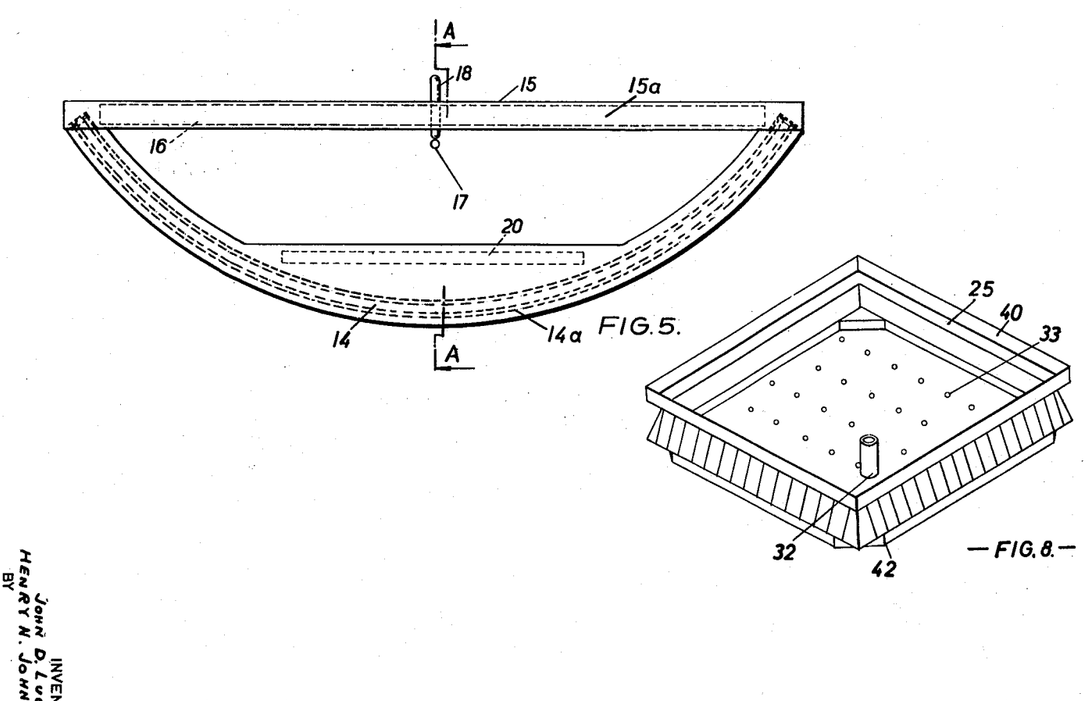
FIG. 5 is a plan view of a display section in accordance with one embodiment of the present invention.
FIG. 8 is a perspective view of a tray of FIG. 7.
Figure 6:
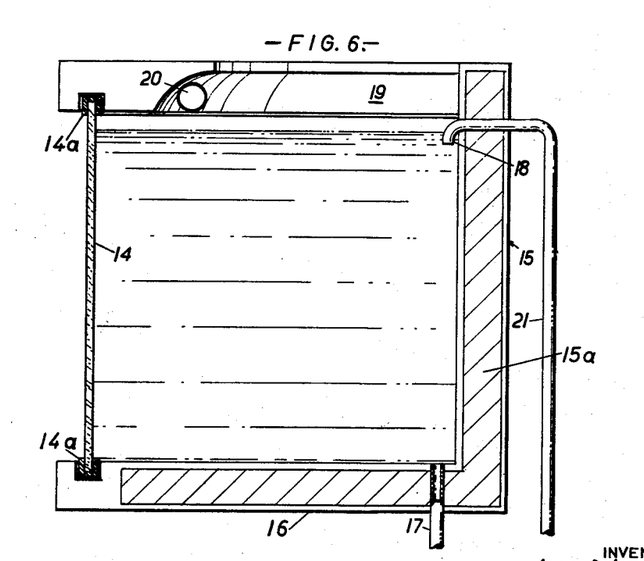
FIG. 6 is a section taken along the line A—A of FIG. 5.
Figure 12:
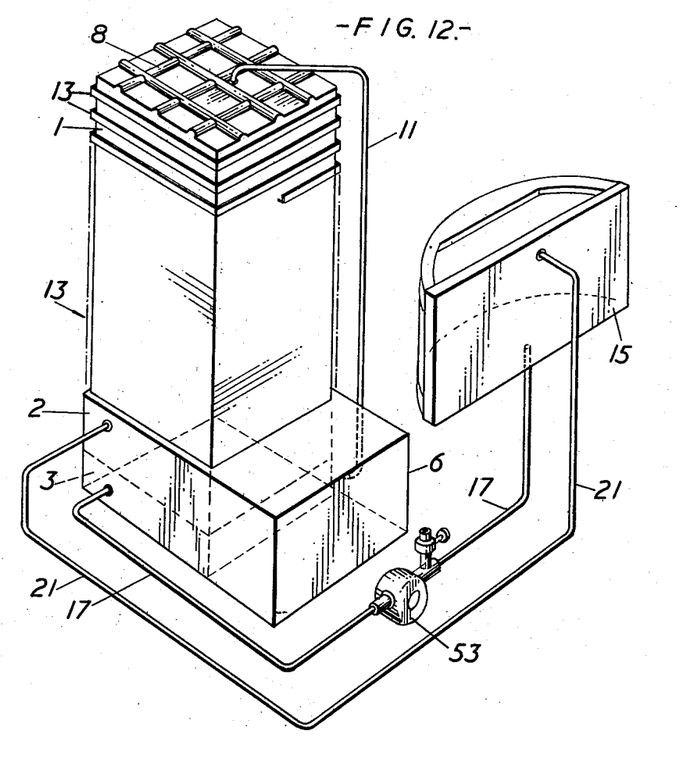

With reference to FIGS. 5, 6 and 12 the display section comprises a front panel 14 of arcuate shape made from ¼″ polished plate "Insulate" double glazing unit set in rubber strip 14a and a back panel 15, which connects the opposite ends of front panel 14, comprising a uniplanar sheet of ¼″ fibre glass reinforced plastic insulated with polystyrene strip 15a. Both panels 14 and 15 are connected by a base 16 of similar material to that of back panel 15, through the upper portion of the back panel 15 projects a horizontal overflow pipe 18 and through the base 16 projects a ¾″ polyethylene inlet pipe 17, this latter pipe being the inlet for the sea-water necessary to maintain the displayed shellfish in healthy condition. The sea-water is pumped into the display section through pipe 17 using the pump of FIG. 11 and leaves the unit through overflow pipe 18 and return pipe 21 to return to the reservoir in the container 2 from which it was taken. The display section is covered by a fibre glass reinforced plastic sheet 19 having a fluorescent light 20 which provides adequate lighting for effective display of the shellfish.

Figure 7:
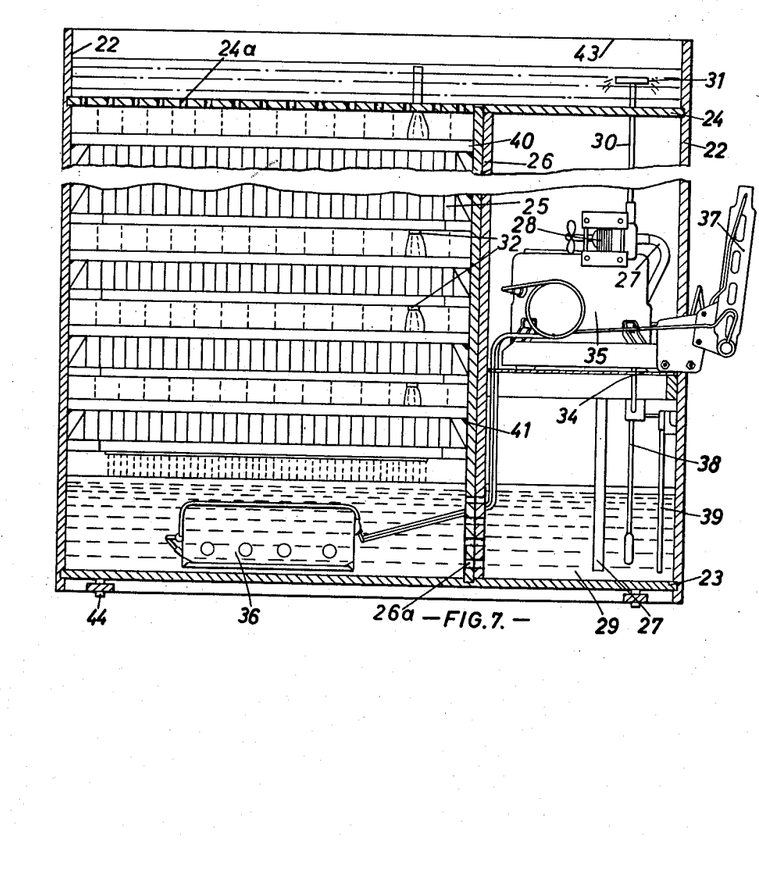
FIG. 7 is a side elevation of a vertical section of a unit according to another embodiment of the present invention.

With reference to FIGS. 7 and 8 the unit comprises side walls 22 and base 23. Made from ¾″ marine plywood (waterproof bonded) and a shelf 24 which is co-extensive with the perimeter of the unit. The space enclosed by side walls 22, base 23 and shelf 24 is divided into two portions by an insulated wall 26 of 1″ expanded polystyrene. Disposed in one portion of the space are trays 25 the bottom part of this portion forming the reservoir 29 for the sea-water. The part of shelf 24 disposed above the trays 24 has perforations 24a as does the portion of the insulating wall 26 beneath the trays 25, these perforations being 26a.

The other portion of the space encompassed by the sides 22, shelf 24 and base 23 is divided by a horizontal double marine plywood shelf 34 insulated with 1″ polystyrene into an upper portion forming a housing which contains a refrigerating unit 35 sealed and having an aluminium or stainless steel evaporating system 36 disposed in the reservoir 29 of sea-water, a condenser 37 and a compressor (not shown). Also disposed in this housing is a water pump 28 which is suitably that shown in FIG. 11 which pumps sea-water from the reservoir 29 through inlet 27 disposed in the portion below the shelf 34, through pipe 30 made of rigid polystyrene to an outlet 31 which is situated below the water level in the shelf 24 to avoid undue foaming. The sea-water then proceeds under gravity through the trays 25, the level in each tray being determined by the dimensions of the overflow 32 and the perforations 33 the number and size of which are dependent upon the required rate of flow of sea-water. Also disposed beneath the shelf 34 and dipping in the reservoir 29 are a thermostatic control 38 and a heating element 39 for use in conditions which are too cold for the shellfish to be stored.

Each tray 25 as seen from FIG. 8 has a projecting flange 40 around its upper end by means of which co-operation with the teak projection 41 in the side wall 22 and the insulating wall 26 is attained. The shaped base 42 is for the purpose of rendering the trays mutually stackable.

A transparent lid 43 is provided for the whole unit and the base 23 is fitted with levelling screws 44.

Figure 9:
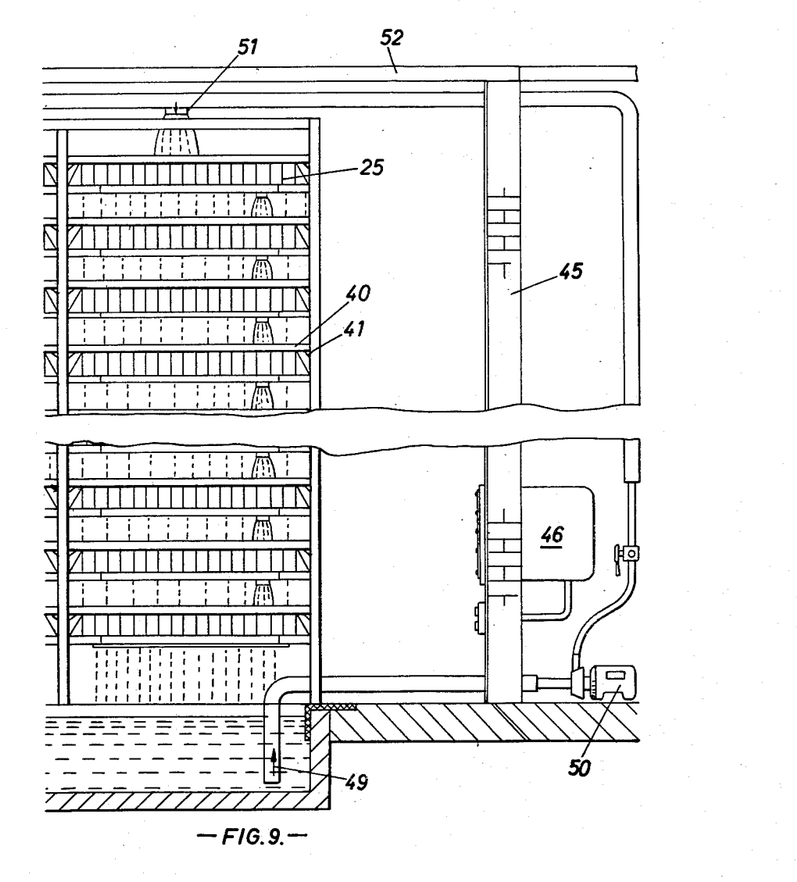
FIG. 9 is a large scale fragmentary vertical section of a unit according to one embodiment of the present invention incorporating an air refrigeration unit.
Figure 10:
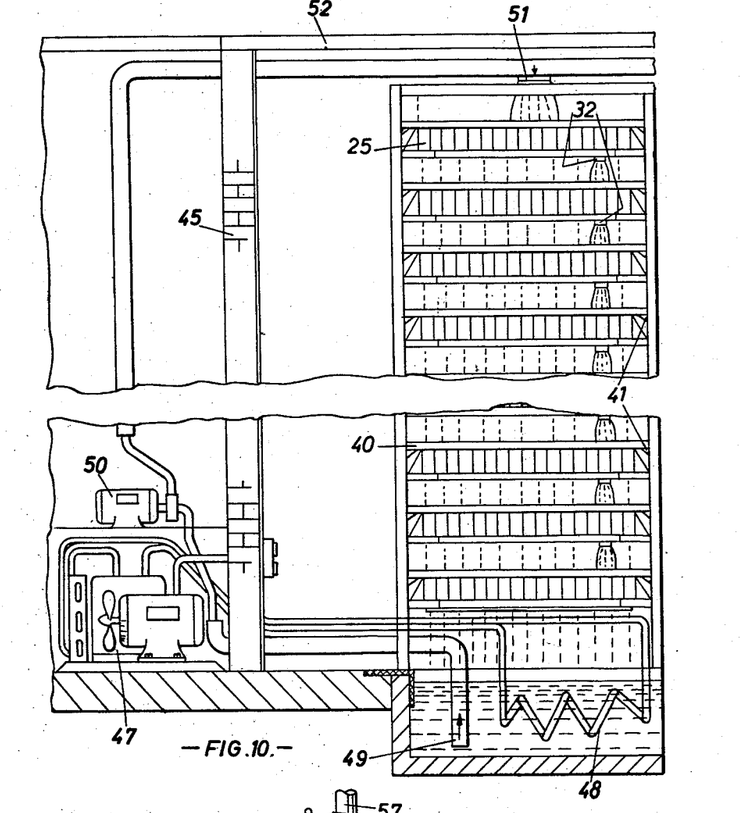
FIG. 10 is a similar large scale fragmentary vertical section of a unit according to the present invention incorporating a water refrigeration unit.

Referring to FIGS. 9 and 10, in which like numerals refer to similar parts as with FIGS. 7 and 8, the large scale units are disposed within insulated walls 45, and externally of these walls is disposed either an air refrigeration unit 46 to supply cooling to the air in the entire storage room or an immersion refrigeration unit 47 to chill only the water directly, by means of its cooling coils 48.

As in the previously described units, water is pumped through the inlets 49 and pump 50 to the inlets 51 (only one shown) situated beneath the insulating ceiling 52 and leading directly into the topmost tray 25 for gravity progression through the vertically aligned trays 25. The walls of the several units forming a battery of units are of timber or aluminium.

A unit according to the invention may be installed in retail or wholesale outlets, catering or domestic establishments or in transit depots on the coast or inland, and may additionally act as a transporting unit for the shellfish. Such a unit may be duplicated as required to form a battery, the final size being determined by the space available for storage and the purpose of the particular storage unit. For example, a major installation might comprise storage space for several tons of shellfish whereas an installation in a hotel or restaurant or small retail sales outlet would comprise space for only a few hundredweights.

Where the unit is intended to be installed in a retail outlet, display of the shellfish may be advantageous and it may be desirable to ally the storage unit with a display unit.

We claim:
1. A unit for storing live shellfish which comprises a plurality of trays disposed in vertical alignment one above the other, a water feeding device for feeding water to the uppermost tray, each tray having at least one perforation in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray, a reservoir below the trays for receiving water from the lowermost tray and a pump for feeding water from the reservoir to the water feeding device.

2. A unit for storing live shellfish which comprises a plurality of trays disposed in vertical alignment one above the other, a water feeding device for feeding water to the uppermost tray, each tray having a plurality of perforations in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray, a reservoir below the trays for receiving water from the lowermost tray and a pump for feeding water from the reservoir to the water feeding device.

3. A unit for storing live shellfish which comprises a plurality of trays disposed in vertical alignment one above the other, a water feeding device for feeding water to the uppermost tray, each tray having a plurality of perforations in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray, a reservoir below the trays for receiving water from the lowermost tray and a pump for feeding water from the reservoir to the water feeding device, said pump comprising a rigid casing, a knuckle on said rigid casing, an inlet for water and air and an outlet for aerated water, an impeller arranged to rotate on said casing and a plurality of flexible vanes integrally mounted on said impeller so as to impinge on the knuckle on rotation of the impeller whence air and water is sucked in through the inlet and water is expelled through the outlet.

4. A unit for storing live shellfish which comprises a plurality of trays disposed in vertical alignment one above the other, a water feeding device for feeding water to the uppermost tray, each tray having a plurality of perforations in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray, a reservoir below the trays for receiving water from the lowermost tray, a pump for feeding water from the reservoir to the water feeding device, and a filter disposed between the lowermost tray and the reservoir.

5. A unit for storing live shellfish which comprises a plurality of trays disposed in vertical alignment one above the other, a water feeding device for feeding water to the uppermost tray, each tray having a plurality of perforations in the base thereof and at least one overflow perforation in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray, a reservoir below the trays for receiving water from the lowermost tray, a pump for feeding water from the reservoir to the water feeding device, a filter disposed between the lowermost tray and the reservoir, cooling means for cooling the air and water in the unit, heating means for heating the air and water in the unit, and a thermostat control for regulating the temperature of the air and water in the unit.

6. A unit for storing live shellfish which comprises a plurality of trays disposed in vertical alignment one above the other, a water feeding device for feeding water to the uppermost tray, each tray having a plurality of perforations in the base thereof and at least one overflow perforation in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray, a reservoir below the trays for receiving water from the lowermost tray, a pump for feeding water from the reservoir to the water feeding device, and a display section which comprises a chamber having a window for viewing the interior thereof, means for feeding water from the reservoir to the chamber and means for delivering water from the chamber to the reservoir.

7. A unit for storing live shellfish which comprises a plurality of trays disposed in vertical alignment one above the other, a water feeding device for feeding water to the uppermost tray, each tray having a plurality of perforations in the base thereof and at least one overflow perforation in the base thereof such that water fed to the uppermost tray passes through each tray, the number and size of the perforations in the base of each tray providing means for controlling the water flow therethrough, in relation to the amount of water from the feeding device supplied to the uppermost tray, to maintain a depth of water in the tray sufficient for providing for partial immersion of the shellfish in each tray.

References Cited by the Examiner
UNITED STATES PATENTS

| | | | |
|---|---|---|---|
| 1,248,169 | 11/17 | Schnoor | 119—5 |
| 2,091,695 | 8/37 | Thuma | 119—5 |
| 2,189,356 | 2/40 | Briggs | 103—117 |
| 2,302,336 | 11/42 | Macdonald | 119—2 |
| 2,470,979 | 5/49 | Duncan | 119—14.09 |
| 2,594,474 | 4/52 | McGrath | 119—3 |
| 2,680,424 | 6/54 | Brown | 119—3 |
| 2,740,378 | 4/56 | Duncan | 119—14.09 |
| 2,890,680 | 6/59 | Malkin | 119—2 |
| 3,025,831 | 3/62 | Berardi | 119—2 |
| 3,028,837 | 4/62 | Tuttle | 119—3 |

SAMUEL KOREN, *Primary Examiner.*
ALDRICH F. MEDBERY, *Examiner.*